(12) United States Patent
Teffer et al.

(10) Patent No.: US 8,442,749 B2
(45) Date of Patent: May 14, 2013

(54) METHOD FOR INCORPORATING INDIVIDUAL VEHICLE DATA COLLECTION AND DETECTION AND RECORDING OF TRAFFIC VIOLATIONS IN A TRAFFIC SIGNAL CONTROLLER

(75) Inventors: Dean W. Teffer, Austin, TX (US); Michael C. Stricklin, Austin, TX (US); Alexander Sherwood, Marble Falls, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1906 days.

(21) Appl. No.: 10/557,915

(22) PCT Filed: May 19, 2004

(86) PCT No.: PCT/US2004/015714
§ 371 (c)(1),
(2), (4) Date: Nov. 21, 2005

(87) PCT Pub. No.: WO2004/104782
PCT Pub. Date: Dec. 2, 2004

(65) Prior Publication Data
US 2006/0287807 A1   Dec. 21, 2006

Related U.S. Application Data

(60) Provisional application No. 60/471,685, filed on May 19, 2003.

(51) Int. Cl.
*G08G 1/017* (2006.01)

(52) U.S. Cl.
USPC .......................................... 701/117; 701/119

(58) Field of Classification Search ................. 701/207, 701/209, 210, 211, 213, 301, 300, 117–119; 340/903, 929
See application file for complete search history.

(56) References Cited

U.S. PATENT DOCUMENTS

| | | | | |
|---|---|---|---|---|
| 5,134,393 A * | 7/1992 | Henson | | 340/933 |
| 5,917,432 A * | 6/1999 | Rathbone | | 340/907 |
| 6,281,808 B1 * | 8/2001 | Glier et al. | | 340/933 |
| 6,516,273 B1 * | 2/2003 | Pierowicz et al. | | 701/301 |
| 6,813,554 B1 * | 11/2004 | Ebert | | 701/117 |
| 7,187,301 B2 * | 3/2007 | Lu | | 340/929 |
| 7,327,282 B2 * | 2/2008 | Crocker et al. | | 340/936 |
| 7,440,850 B2 * | 10/2008 | Kim | | 701/209 |

\* cited by examiner

*Primary Examiner* — Richard M. Camby

(57) ABSTRACT

The present disclosure teaches a software and hardware system capable of operating on a signal controller platform which detects and records individual vehicle data including but not limited to dangerous driving behavior such as red light running and speeding. The disclosure teaches sharing of the computing platform and infrastructure of the traffic control system. The disclosure also teaches receiving, interpreting, and organizing data collected through the traffic control system's vehicle detection infrastructure, and driving cameras, video, or other recording devices to provide additional evidence of an individual vehicle's behavior.

8 Claims, 4 Drawing Sheets

Figure 1:
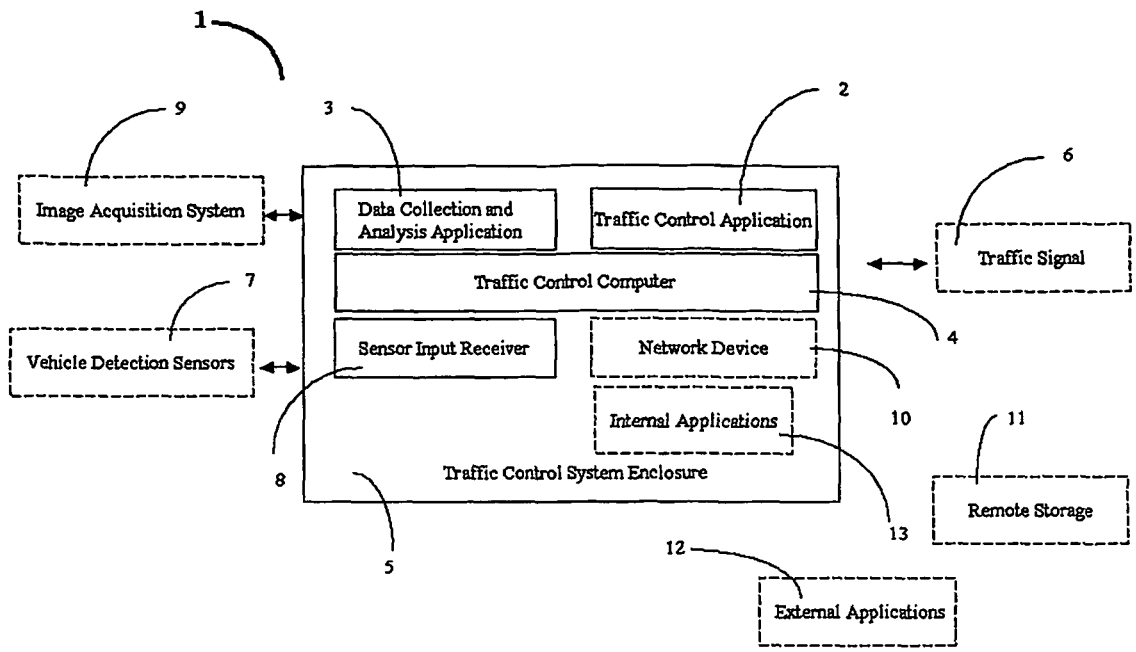

METHOD FOR INCORPORATING INDIVIDUAL VEHICLE DATA COLLECTION AND DETECTION AND RECORDING OF TRAFFIC VIOLATIONS IN A TRAFFIC SIGNAL CONTROLLER

BACKGROUND OF THE INVENTION

1. Field of Invention

This invention relates to traffic control systems, specifically providing the means to enable traffic signal controllers to collect individual vehicle data for safety analysis, automated enforcement, traffic control system assessment, and traffic condition assessment 2. Discussion of Prior Art Traffic signal controllers typically collect data concerning traffic count, occupancy, and average speed. Current state of the art is for the signal controller to collect data, and bin or aggregate it into predefined time increments, for example fifteen minute or one-hour intervals. Traffic information available from the controller, then, is based strictly on these aggregations. Information on individual vehicles traveling through the intersection is not available.

Municipalities, other government agencies, and traffic researchers have long sought an efficient way to identify and analyze dangerous driving behavior in order to improve intersection safety (through signal timing, intersection re-engineering, or improved enforcement). Red light running and speeding are the behaviors most often researched.

Because traffic signal controllers present only aggregate data, it is impossible to identify events associated with individual vehicles. Further, vehicle data that are tracked (occupancy and count) do not have either time or signal status associated with them For example, vehicle counts and occupancy data do not include the dimension of signal status—when the light was red, green, or amber. The result is that it is impossible to analyze traffic signal controller data to determine the number, frequency, time phasing, or severity of dangerous driving behavior such as red light running and speeding. Severity can be determined by analyzing a combination of speed, acceleration, vehicle type, and intersection clearance time.

Current methods to analyze red light running include hand counts, video taping, and collecting data from automated enforcement systems. These methods suffer from several flaws: Hand counts are inaccurate, and liable to miss scenarios where multiple violations occur. Hand counts are impossible to validate—there is no empirical evidence of a violation. Further, hand counts typically collect only a fraction of the data required to fully analyze driver behavior. Hand counts cannot collect information relating to speed, acceleration, length into the red light cycle, or intersection clearance time. Video data collection improves only on accuracy of hand count, but not on the quality of related data (speed, acceleration, etc.).

Automated enforcement devices are capable of collecting much of the information needed for safety research. Red light enforcement systems operate in conjunction with traffic signal controllers. The enforcement device receives status input and uses vehicle detection devices to determine when a violation is occurring. Automated speed enforcement systems use laser or radar to calculate vehicle speed, and do not require a connection to a signal controller to determine a violation. In both cases however, data is typically collected only in the process of active enforcement. The data collected by such devices is directly affected by the visibility of the enforcement device to the drivers being monitored, much the same way the presence of a police cruiser at an intersection win have an effect on speeding and red light running.

Additionally, most, if not all, data analysis is done looking at single approaches to intersections with the remote (from the intersection) analysis of historical data. This precludes the collection and analysis of data from multiple vehicles and multiple approaches concurrently, providing results (to the traffic control system, for example) in near real time.

In conclusion, no traffic signal controller can identify and record dangerous driving behavior, and no automated enforcement device is capable of operating as a traffic signal controller and unobtrusively collecting intersection safety information. Further, because they cannot identify individual vehicle events, and capture information related to those events, current traffic signal controllers are not capable of operating as automated enforcement systems in addition to their function of traffic control.

SUMMARY

The present disclosure teaches a software and hardware system capable of operating on a signal controller platform which detects and records individual vehicle data including but not limited to dangerous driving behavior such as red light running and speeding. The disclosure teaches sharing of the computing platform and infrastructure of the traffic control system. The disclosure also teaches receiving, interpreting, and organizing data collected through the traffic control system's vehicle detection infrastructure, and driving cameras, video, or other recording devices to provide additional evidence of an individual vehicle's behavior.

Aspects of the invention may be found in a system for collecting and analyzing data relating to individual vehicles as they approach or pass through an intersection. The system may include sensors for detecting vehicles, sensor input receivers, a traffic signal, a traffic control computer, an image acquisition system, and a network device. The system may also include a traffic control application, other internal applications, and a data collection and analysis application. Each of these applications may jointly operate on the traffic control computer.

Vehicle data may be acquired by the sensors and communicated to the traffic control computer through the sensor input receiver. The traffic control application may communicate with the traffic signal and determine its state. The traffic control application may also communicate with the data collection and analysis application, providing both vehicle detection data and traffic signal state data.

Further aspects of the invention may be found in the system combining vehicle and signal state data for the purpose of analysis and event detection or prediction. For example, the data collection and analysis application may associate a timestamp with each vehicle detection event. Furthermore, the data collection and analysis application may associate a timestamp with each traffic signal state change event, note the traffic signal state relative to each vehicle detection event, and may combine this information to create a record of the vehicle's passage through the intersection.

Other aspects of the invention may be found in a method for detecting traffic violations or other safety hazards at the intersections. The method may include analyzing sensor data to determine or predict a vehicle's path up to and through the intersection. For example, the sensors may detect a vehicle moving towards the intersection. The data collection and analysis application may use the data to calculate the speed of the vehicle, and determine that it is exceeding the speed limit.

The method may also include analyzing sensor data combined with signal state data to determine if a traffic signal violation has occurred or will occur. For example, the sensors may detect a vehicle moving towards the intersection at which the light is red. The data collection and analysis application may determine, after calculating the speed, acceleration, proximity to the intersection, and traffic signal state, that the vehicle is running or is likely to run the light.

The method may also include analyzing sensor data from multiple vehicles and multiple approaches to the intersection to determine the likelihood of a collision or near collision. For example, the sensors may detect two vehicles approaching the intersection at the same time on different paths of travel. The data collection and analysis application may determine that, after calculating the speed, acceleration, and location of the two vehicles, their paths of travel may result in a collision. The integration of the data collection and analysis function with the traffic control system enables the invention to collect and analyze data from multiple vehicles and multiple approaches concurrently, providing results (to the traffic control system, for example) in near real time.

Other aspects of the invention may be found in a system for acquiring images of desired events, combining the images with other data collected and calculated relative to the events, and transferring the data and/or images through an interconnected network. For example, the sensors may detect vehicles approaching the intersection, and the data collection and analysis application may detect or predict speeding or red light violations, or an imminent collision. The data collection and analysis application may then schedule an image or images to be taken of each of these vehicles or events as they occur at or near the intersection. Furthermore, the data collection and analysis application may combine the images and data relating to each event, and transfer them to a remote storage device or external applications using the network device.

Further aspects of the invention may be found in a system locally transferring data and or analysis from the data collection and analysis application to either the traffic control application or to another application running on the traffic control computer. For example, the sensors may detect a vehicle approaching the intersection, and the data collection and analysis application may relate that data with the current signal state to predict a red light violation. Further, the data collection and analysis application may communicate that prediction to the traffic control application which in turn may communicate with the traffic signal to extend the red condition for the lanes of cross traffic.

Further aspects of the invention may be found in a system for analyzing the traffic signal state to determine if it is in concurrence with the parameters defined by the traffic control application. For example, the data collection and analysis application may communicate with the traffic control application to determine the parameters for the signal timing. The data collection and analysis application may also analyze the number of seconds a particular signal displays an amber light over a period of hours, days, or weeks. Further, the data collection and analysis application may determine that the length of the amber signal has declined to the point where it is out of specification and communicate this information either to the traffic control application, to an external application, or both.

DETAILED DESCRIPTION

FIG. 1 is a schematic block diagram of a system for collecting and analyzing vehicle data according to the invention.

The system 1 includes a traffic control application 2 and a data collection and analysis application 3 which both operate on a traffic control computer 4. The traffic control computer 4 may reside in a traffic control system enclosure 5. The traffic control computer 4 may be connected to a traffic signal 6 and sensor input receiver 8. Further, the sensor input receiver 8 may receive inputs from the vehicle detection sensors 7. Similarly, the data collection and analysis application 3 may be connected to an image acquisition system 9. The traffic control computer may include a network device 10 that allows connection to a remote storage device 11 and support of external applications 12.

The vehicle detection sensors 7 may detect a vehicle or vehicles. The sensors 7 may communicate data associated with the vehicle or vehicles through the sensor input receiver 8 to the traffic control computer 4. The traffic control computer 4 and/or the traffic control application 2 may communicate data from sensors 7 and traffic signal 6 to the data collection and analysis application 3. The data collection and analysis application 3 may analyze data received to predict the vehicle's path through the intersection, including but not limited to determining whether a traffic violation or other safety hazard has occurred or is likely to occur. Further, the data collection and analysis application 3 may schedule a time for the acquisition of one or more images associated with an event relating to the vehicle's travel path using the image acquisition 9. Furthermore, the data collection and analysis application 3 may combine data received from the image acquisition system 9, the vehicle detection sensors 7, and the traffic signal 6 in the process of creating a record of the vehicle's travel up to and through the intersection, as well as temporarily storing the record on the traffic control computer 6 before making the data available to internal applications 13, or accessing the network device 10 for transmission to either remote storage 11 or external applications 12.

Figure 2:
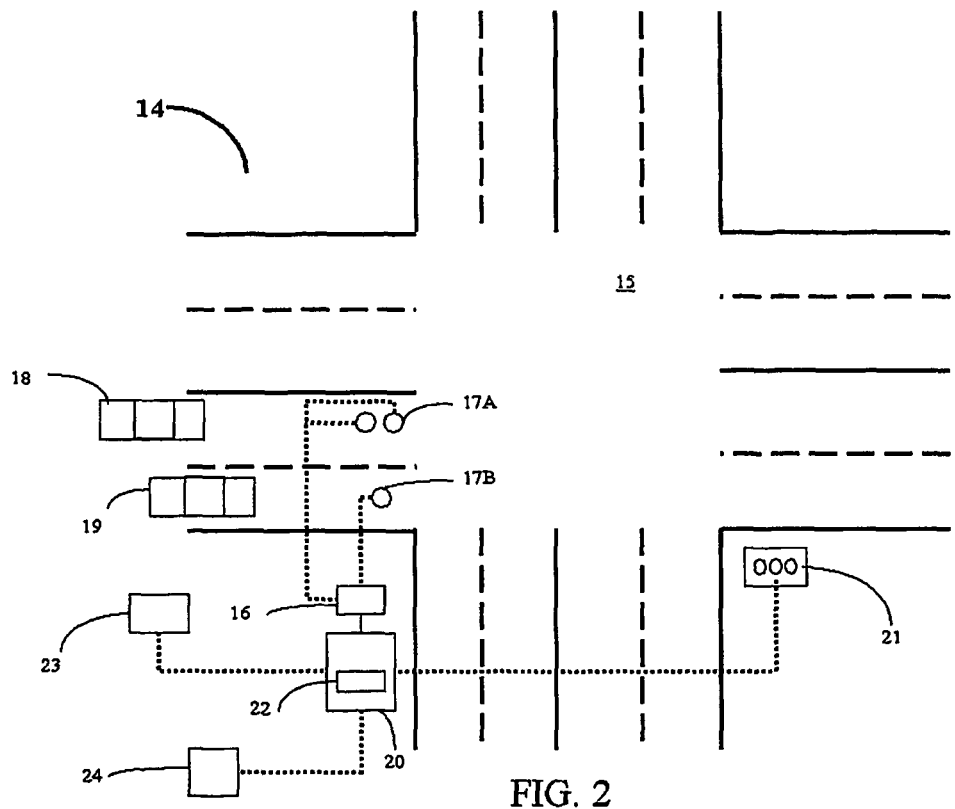

FIG. 2 is a schematic block diagram of an exemplary embodiment of the system according to FIG. 1. In this exemplary embodiment 14 an intersection is shown 15. On at least one approach to the intersection 15, vehicle detection sensors 16 may define detection zones 17A and 17B. The vehicle detection sensors may be placed, for example, in, on, under, or above the road. The sensors may detect one or more vehicles 18 and 19 approaching the intersection. The sensors 16 may signal the traffic control computer 20 with the data associated with the vehicles 18 and 19. Furthermore, the traffic control computer 20 may provide the data associated with the vehicles 18 and 19 to the data collection and analysis application 22. The data collection and analysis application 22 may receive signal state data either directly from the traffic signal 21 or from the traffic control computer 20. The data collection and analysis application may analyze data associated with the vehicles 18 and 19 in conjunction with the signal state data and predict or detect the vehicle's path of travel up to and through the intersection. The data collection and analysis application may timestamp and record each of the detection events, signal states, and signal change events associated with the vehicle's travel up to and through the intersection.

In another exemplary embodiment, the data collection and analysis application 22 may analyze the data relating to a vehicle's approach to the intersection to determine if a traffic violation or other safety hazard has occurred or is likely to occur. If the analysis indicates that such a violation or hazard is likely to occur, the data can be characterized as falling within a "violation" or "hazard" classification. Furthermore, the data collection and analysis application 22 may capture, or schedule a time for the acquisition of, one or more images associated with the traffic violation or safety hazard using the image acquisition system 23. Images created with the image acquisition system 23 and data collected and analyzed by the data collection and analysis application 22 may be combined and transmitted to a remote storage device 24.

For example, vehicle 18 may approach the intersection 15. The vehicle 18 may pass through detection zone 17A, and may cause a detection event or events to be sent through the vehicle detection sensor 16 to the traffic control computer 20. Furthermore, the data collection and analysis application 22 may receive the detection data associated with vehicle 18 from the traffic control computer 20. The data collection and analysis application 22 may also receive data from the traffic control computer 20 regarding the status of the traffic signal 21 which may be red. The data collection and analysis application 22 may then associate the traffic signal 21 status with the detection data and analysis relating to vehicle 18. The data collection and analysis application 22 may determine that a violation has occurred or is likely to occur. For example, the data collection and analysis application 22 may measure or determine the location, speed, and or magnitude of acceleration of vehicle 20, relate this data to the status of the traffic signal 21, and ascertain the likelihood of vehicle 18 running a red light. Furthermore, the data collection and analysis application 22 may schedule images to be acquired of the red light violation using the image acquisition system 23. Images and data associated with the red light violation may then be transferred to a remote storage device 24.

In another example, vehicle 19 may approach the intersection 15. The vehicle 19 may pass through detection zone 17B, and may cause a detection event or events to be sent through the vehicle detection sensor 16 to the traffic control computer 20. Furthermore, the data collection and analysis application 22 may receive the detection data associated with vehicle 19 from the traffic control computer 20. The data collection and analysis application 22 may also receive data from the traffic control computer 20 regarding the status of the traffic signal 21 and associate that status with the detection data associated with vehicle 19. Based on its analysis, the data collection and analysis application 22 may record and store the data, transfer the data to a remote storage device 24, or schedule images to be recorded using the image acquisition system 23.

In another example, vehicle 18 may approach the intersection 15. The vehicle 18 may pass through detection zone 17A, and may cause a detection event or events to be sent through the vehicle detection sensor 16 to the traffic control computer 20. The data collection and analysis application 22 may receive the detection data associated with the vehicle 18, calculate the speed of vehicle 18, and determine that a speeding violation has occurred. Furthermore, the data collection and analysis application 22 may schedule images to be acquired of the speeding violation using the image acquisition system 23. Images and data associated with the speeding violation may then be transferred to a remote storage device 24.

Figure 3:
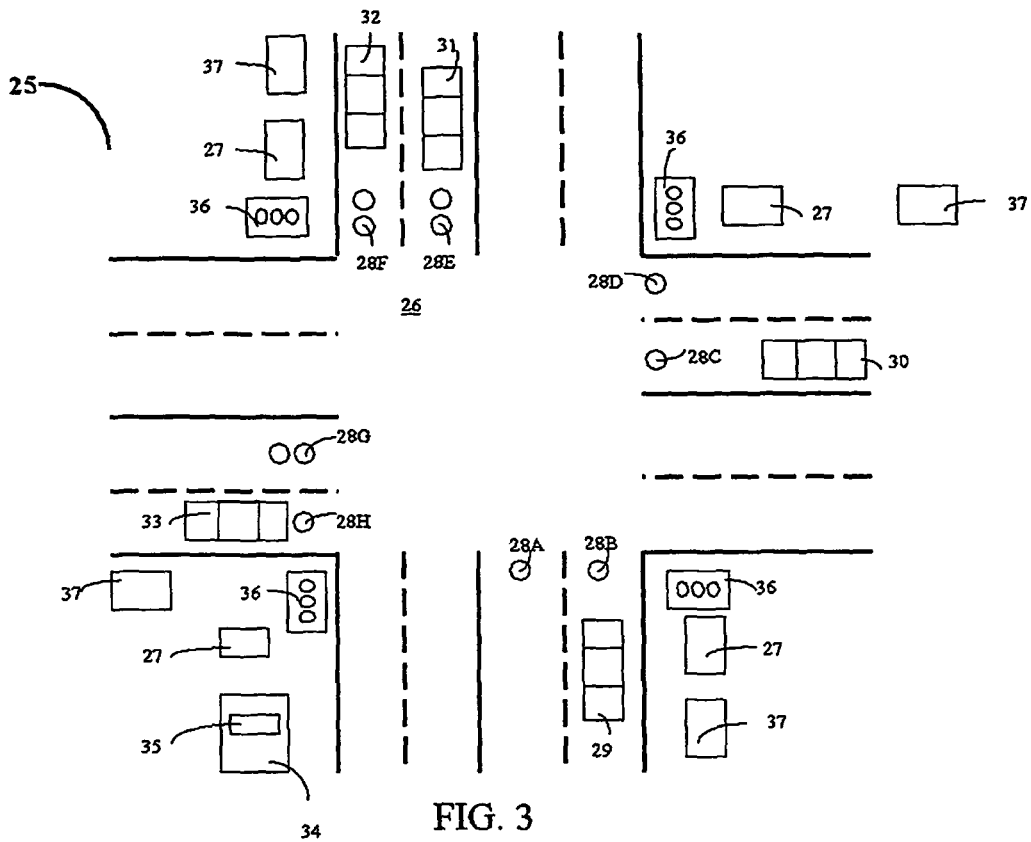

FIG. 3 is a schematic block diagram of an exemplary embodiment of the system according to FIG. 1. In this exemplary embodiment 25, an intersection is shown 26. On multiple approaches to the intersection 26, one or more detection sensors 27 may define detection zones 28A, 28B, 28C, 28D, 28E, 28F, 28G, and 28H. The vehicle detection sensors may be placed, for example, in, on, under, or above the road. The sensors may detect one or more vehicles 29, 30, 31, 32, and 33 approaching the intersection. The sensors 27 may signal the traffic control computer 34 with the data associated with the vehicles 29, 30, 31, 32, and 33. Furthermore, the traffic control computer 34 may provide the data associated with the vehicles 29, 30, 31, 32, and 33 to the data collection and analysis application 35. In this example, two vehicles 29 and 30 approach the intersection. The vehicle 29 may pass through detection zone 28B and vehicle 30 may pass through the detection zone 28C resulting in detection events recorded by the sensors 27. The detection events may be transferred to the traffic control computer 34 and then to the data collection and analysis application 35. Using the detection event data, the data collection and analysis application 35 may determine location, speed, and acceleration of both vehicles 29 and 30. The data collection and analysis application 35 may also analyze signal state data based on the state of the traffic signals 36. Furthermore, the data collection and analysis application may predict a path of travel for both vehicles 29 and 30, based on the analysis of the detection event data and signal state data, to determine if there is a potential for a collision or a near collision of the two vehicles. In the event of detecting a collision or near collision, the data collection and analysis application 35 may schedule the acquisition of images of the event using an image acquisition system 37.

In another example, two vehicles 31 and 33 approach the intersection. Vehicle 31 may be an emergency vehicle, and vehicle 33 may be a privately owned vehicle. Vehicle 31 may travel through the detection zone 28E and vehicle 33 may travel through the detection zone 28H, with sensors 27 recording the detection events. The detection events may be transferred to the traffic control computer 34 and then to the data collection and analysis application 35. Furthermore, the emergency vehicle 31 may communicate information to the traffic control computer 34 about its status as an emergency vehicle. The data collection and analysis application 35 may analyze traffic signal 36 status in conjunction with the detection events related to vehicles 31 and 33. Further, the data collection and analysis application 35 may predict or detect a red light violation by vehicle 33, and notify the traffic control computer 34 of the detection. The traffic control computer 34 may then communicate the impending or occurring red light violation of vehicle 33 to the emergency vehicle 31, thereby reducing the likelihood of a collision.

In another example, two vehicles 32 and 33 approach the intersection. Vehicle 32 may travel through the detection zone 28F and vehicle 33 may travel through the detection zone 28H. Sensors 27 may record the detection events. The detection events may be transferred to the traffic control computer 34 and then to the data collection and analysis application 35. The data collection and analysis application 35 may analyze and relate traffic signal 36 status to the detection events related to vehicles 32 and 33 and may further predict travel paths of the two vehicles. The signal phasing may be such that both vehicles 32 and 33 are approaching the intersection with the traffic signal 36 showing a red light. The next planned phase of the traffic signal 36 may be to display a green light to vehicle 32 and to continue to display a red light to vehicle 33. The data collection and analysis application 35 may, after analysis, predict or detect a red light violation either occurring or about to occur based on the location, travel path, speed, or acceleration of vehicle 33. The data collection and analysis application 35 may also communicate the likelihood or actuality of this red light violation to the traffic control computer 34. The traffic control computer 34 may then preempt the planned change of status of the traffic signal 36 that is facing vehicle 32 and hold the traffic signal 36 in the red display condition until vehicle 33 is clear of the intersection.

Figure 4:
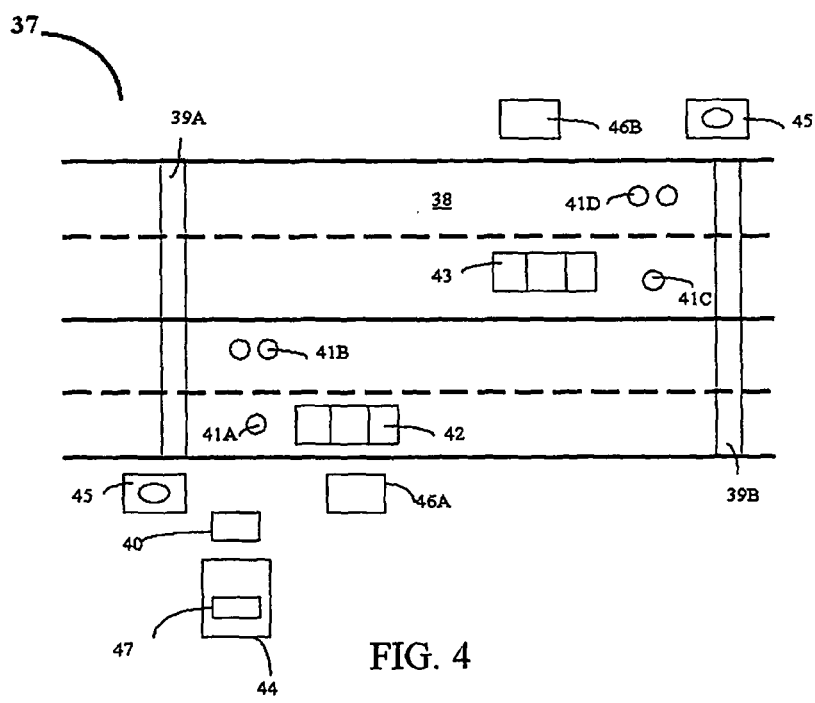

FIG. 4 is a schematic block diagram of an exemplary embodiment of the system according to FIG. 1. In this exemplary embodiment 37, a defined roadway area 38 is shown. Markers, signs, or striping areas 39A and 39B may define the boundaries of the area 38. The zone may be a school zone, construction zone, neighborhood or other roadway zone defined by boundaries. A vehicle detection sensor 40 may define detection zones 41A, 41B, 41C, and 41D. The vehicle detection sensor 40 may detect vehicles 42 and 43 as they pass through detection zones 41A, 41B, 41C, or 41D. Further, the vehicle detection sensor 40 may communicate detection events to the traffic zone controller 44. The traffic zone controller 44 may communicate with indicator lamps 45 to notify passing vehicles 42 and 43 that they are traveling through a defined roadway area 38, and that, as a result, special conditions such as speed limits may apply. In this example, vehicle 42 may travel through detection zone 41A and vehicle 43 may travel through detection zone 41C. Vehicle detection sensor 40 may detect vehicles 42 and 43 as they pass through detection zones 41A and 41C respectively. Vehicle detection sensor 40 may communicate these detection events to the traffic zone controller 44, and the traffic zone controller 44 may further communicate the detection events to the data collection and analysis application 47. The traffic zone controller 44 may also communicate the status of the indicator lamps 45 to the data collection and analysis application 47. Furthermore, the data collection and analysis application 47 may calculate the speed and location of vehicles 42 and 43 and correlate this data with the status of the indicator lamps 45. The data collection and analysis application 47 may then determine that vehicles 42 and 43 are in violation of the speed limit defined by the indicator lamps 45 being illuminated for the roadway area 38. Further, the data collection and analysis application 47 may schedule images to be captured of the violations using image capture systems 46A and 46B. In this example, the data collection and analysis application 47 may schedule images specifically for vehicle 42 and may use image capture system 46A, and may use image capture system 46B to schedule and record images of vehicle 43.

Figure 5:
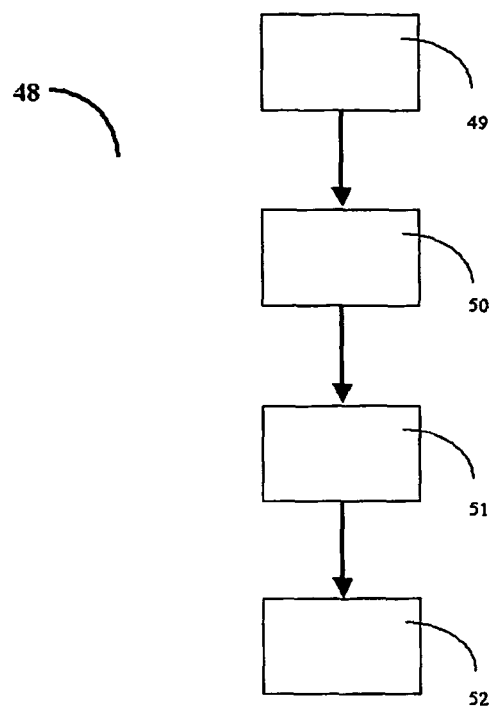

FIG. 5 is a block flow diagram of an exemplary embodiment of a method for use in a system as seen in FIG. 1. In this exemplary method 48, the data collection and analysis system may collect a first set of individual vehicle data 49 and a second set of individual vehicle data 50. Furthermore, the data collection and analysis system may analyze the combination of the first set, the second set, and the differences or similarities between the two sets 51. Finally, the data collection and analysis system may provide the result of the analysis 52 to interested local or external applications. For example, the data collection and analysis system may collect data over the course of a month to determine average traffic volume by hour of the day. The data collection and analysis system may further collect the same set of data in a different month. Finally, the data collection and analysis system may compare the two sets of data to either define a historical model to be used for future reference, or to determine differences in traffic volume on a monthly basis.

In another example, the data collection and analysis system may collect a set of individual vehicle data 49, review a model (historical or preferred) set of data 50, and analyze the similarities and differences in the data sets 51. The result of the analysis 52 may be made known to interested external or internal applications. For example, the data collection and analysis system may collect data on vehicle volumes for different times of day. It may compare actual volumes to historical volumes and determine that volume for the current hour is 10% of the historical average. The data collection and analysis system may then generate a notice of this condition and deliver it to interested local or external applications.

Figure 6:
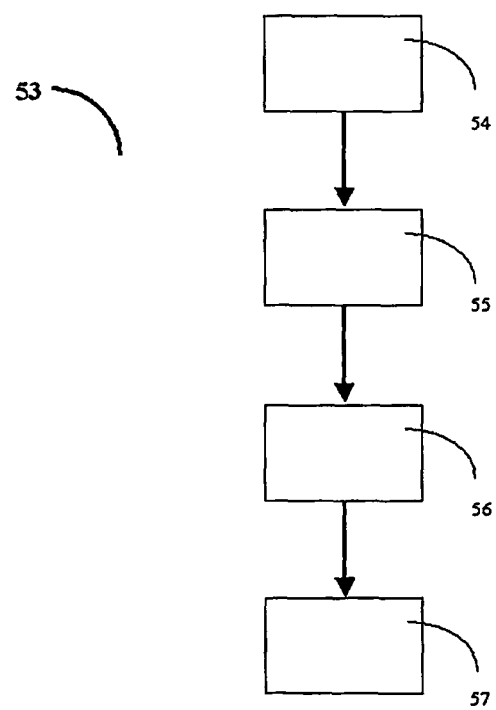

FIG. 6 is a block flow diagram of an exemplary embodiment of a method for use in a system as seen in FIG. 1. In this exemplary method 53, the data collection and analysis system may collect a set of signal state data 54 and a second set of signal state data 55. Furthermore, the data collection and analysis system may analyze the combination of the first set, the second set, and the differences or similarities between the two sets 56. Finally, the data collection and analysis system may provide the result of the analysis 57 to interested local or external applications. For example, the data collection and analysis system may collect data over the course of a month to determine average green, amber, and red timing. The data collection and analysis system may further collect the same set of data in a different month. Finally, the data collection and analysis system may compare the two sets of data to determine if the signal timing has changed in an allowable range. If the change in signal timing is outside of the allowable range, the data collection and analysis application may send a notice to an interested local or external application.

In another example, the data collection and analysis system may collect a set of signal state data 54 and review a model (preferred or historical) set of signal state data 55. Furthermore, the data collection and analysis system may analyze the combination of the first set, the second set, and the differences or similarities between the two sets 56. Finally, the data collection and analysis system may provide the result of the analysis 57 to interested local or external applications. For example, the data collection and analysis system may collect signal state data 54 on green, amber, and red signal display times for each phase change during the course of the day. The data collection and analysis system may review the green, amber, and red signal display times as provided by the model data 55. Further, the data collection and analysis application may compare the model and actual data 56, may determine that the amber signal display times 54 are different from the model 55, and may record the differences over time. Additionally, the data collection and analysis application may determine that the difference between the actual amber signal display time 54 and the model display time 55 is increasing, and may predict that the signal timing will soon be out of specification as determined by the signal timing model. Finally, the data collection and analysis application may communicate the out of specification prediction results 57 interested local or external applications.

Figure 7:
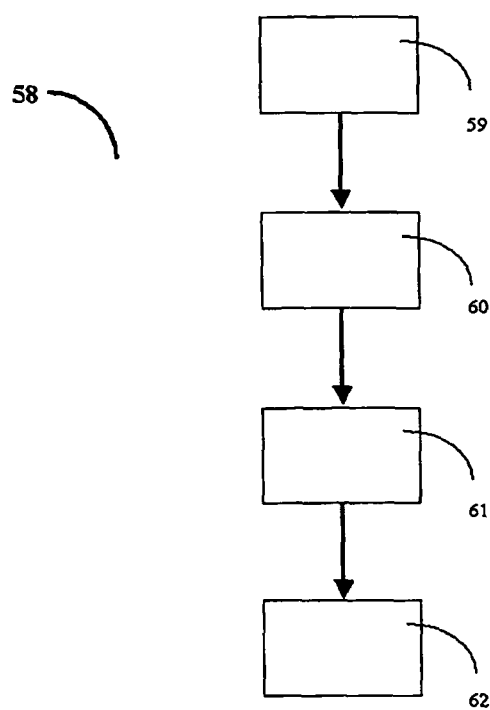

FIG. 7 is a block diagram of an exemplary embodiment of a method for use in a system as seen in FIG. 1. In this exemplary method 58, the data collection and analysis application may collect, combine, and analyze a set of individual vehicle and signal state data 59. The data collection and analysis application may also collect, combine, and analyze a different set of individual vehicle and signal state data 60. Furthermore, the data collection and analysis application may compare the two sets of data 61, and provide results 62 to interested internal or external applications. For example, the data collection and analysis application may collect, combine, and analyze a set of individual vehicle and signal state data to determine the number of red light violations occurring in a particular time period 59. The data collection and analysis application may collect the same type of data over a different time period 60. The data collection and analysis application may compare the data sets 61, and determine that the number of red light violations has increased over the time period, and may report the results 62 to interested internal or external applications.

In another example, the data collection and analysis application may collect, combine, and analyze a set individual vehicle and signal state data 59. The data collection and analysis application may review a second model (preferred or historical) set of data 60. Furthermore, the data collection and analysis application may compare the two sets of data 61, and provide results 62 to interested internal or external applications. For example, the data collection and analysis application may collect, combine, and analyze a set of individual vehicle and signal state data to determine the number of red light violations occurring in a particular time period 59. The data collection and analysis application may review the number of red light running violations in a like time period from the model data 60. The data collection and analysis application may compare the data sets 61, and determine that the number of red light violations from the actual data 59 exceeds the number of violations expected by the model 60, and may report the results 62 in the form of a notice, alarm, or other communication to interested internal or external applications.

The term "communication," as used in the present disclosure, includes direct and indirect transfer of information. For example, the case of a first agent writing a set of data to and a second agent reading the set of data from a shared memory would be included. The case of multiple agents utilizing a common source or conduit for receiving or transmitting data, such as a shared driver which outputs vehicle detection information to two applications, would also be included.

What is claimed is:

1. An integrated traffic control and individual vehicle data collection and analysis system comprising:
   a traffic control computer residing in a roadside traffic control system enclosure;
   an individual vehicle data collection and analysis application operating on the traffic control computer; and
   a sensor positioned above a road,
   wherein the traffic control computer is configured to collect a first set of individual vehicle data at a first time, collect a second set of individual vehicle data at a different time, and analyze a combination of the first set and the second set in order to identify differences and similarities between the two sets and determine whether a number of traffic violations has changed over time.

2. The integrated traffic control and individual vehicle data collection and analysis system of claim 1 further comprising:
   an image acquisition system, wherein the individual vehicle data collection and analysis application is further configured to analyze a combination of at least one of the first and second sets of individual vehicle data with a selected model set of individual vehicle data in order to: identify differences and similarities between the analyzed sets and determine whether a number of traffic violations from the one of the first and second sets set of individual vehicle data exceeds a number in the selected model set; and
   a traffic control application configured to communicate individual vehicle detection data to the individual vehicle data collection and analysis application.

3. The integrated traffic control and individual vehicle data collection and analysis system of claim 1, wherein the individual vehicle data collection and analysis application is further configured to collect a first set of signal state data at a first time, collect a second set of signal state data at a different time, and analyze a combination of the first set of signal state data and the second set of signal state data in order to identify differences and similarities between the two sets of signal state data and determine whether signal timing has changed over time.

4. The traffic control and individual vehicle data collection and analysis system of claim 3 further comprising:
   a traffic control application configured to communicate signal state changes to the individual vehicle data collection and analysis application.

5. The integrated traffic control and individual vehicle data collection and analysis system of claim 1 wherein the individual vehicle data collection and analysis application is further configured to collect a set of signal state data and analyze a combination of the collected set of signal state data and a selected model set of signal state data in order to identify differences and similarities between the two sets of signal state data and determine whether signal timing is within a specification of the selected model set.

6. The integrated traffic control and individual vehicle data collection and analysis system of claim 5 further comprising:
   a traffic control application configured to communicate signal state changes to the individual vehicle data collection and analysis application.

7. The integrated traffic control and individual vehicle data collection and analysis system of claim 1 wherein:
   the individual vehicle data collection and analysis application is further configured to collect concurrent individual vehicle data corresponding to multiple approaches of an intersection and analyze a combination of the concurrent individual vehicle data corresponding to the multiple approaches of the intersection to determine whether one of a collision and a traffic violation may occur; and
   the traffic control computer is further configured to communicate one of the collision and the traffic violation to a vehicle approaching the intersection.

8. The integrated traffic control and individual vehicle data collection and analysis system of claim 7, further comprising:
   an image capture system;
   wherein the individual vehicle data collection and analysis data analysis system is further configured to characterize the concurrent individual vehicle data as falling within a known classification based on the analysis of the combination of the concurrent individual vehicle data corresponding to the multiple approaches of the intersection; and
   wherein the image capture system is configured to capture an image of the intersection in response to characterization of the concurrent individual vehicle data as falling within the known classification.

* * * * *